PROGRAMMING APPARATUS

Filed Aug. 13, 1957 4 Sheets-Sheet 1

INVENTORS
Wallace J. Kabrick
John K. Birch
BY
Mueller & Aichele
Attys.

Aug. 8, 1961 W. J. KABRICK ET AL 2,995,630

PROGRAMMING APPARATUS

Filed Aug. 13, 1957 4 Sheets-Sheet 2

INVENTOR.
Wallace J. Kabrich
John K. Birch
BY
Mueller & Aichele
Attys.

INVENTORS
Wallace J. Kabrick
John K. Birch
BY Mueller & Aichele
Attys.

Aug. 8, 1961 W. J. KABRICK ET AL 2,995,630

PROGRAMMING APPARATUS

Filed Aug. 13, 1957 4 Sheets-Sheet 4

INVENTORS
Wallace J. Kabrick
John K. Birch

BY Mueller & Aichele
Attys.

2,995,630
PROGRAMMING APPARATUS

Wallace J. Kabrick, Plainville, and John K. Birch, Quincy, Ill., assignors to Gates Radio Company, Quincy, Ill., a corporation of Illinois Filed Aug. 13, 1957, Ser. No. 677,932
9 Claims. (Cl. 179—100.1)

This invention relates to radio broadcasting methods and equipment, and more particularly to programming methods and apparatus for recording a program and automatically playing back the recorded material to broadcast the same.

The programs which are broadcast by radio stations frequently include music and other program material which has been recorded on records, tapes, and other reproducing mediums. This recorded material is usually interspersed with announcements and comments which are introduced directly into the program at the time it is broadcast. These announcements may be only a small part of the entire program, but in this method of broadcasting, an announcer must be present whenever such a program is being broadcast, which may be at any time of the day or night. Although an entire program can be transcribed in advance on a master recording, if the entire program is so transcribed the same amount of time would be required in making up the program as when the announcer is present during the broadcast and the gain is not enough to compensate for the extra effort required.

It is an object of this invention to provide a method of transcribing a program on a master recording in which the length of time required to set up the program will be held to a minimum.

A further object of this invention is to provide a transcribing machine for setting up a program in accordance with the method of the preceding paragraph.

A further object of the invention is to provide a transcribing machine for setting up a program on a master tape in which a part of the program material which is to be reproduced from recordings may be represented by control signals recorded on the master tape.

A further object of the invention is to provide a playback machine for reproducing program material recorded on a master tape and for interspersing supplementary program material by playing recordings in response to control signals recorded on the master tape.

A feature of the invention is a provision of a method of transcribing a program on a master recording in which announcements are recorded on the master recording and control signals representing recorded material used in the program are also recorded on the master recording. The control signals may be followed by further announcements and control signals in any desired sequence, and since the recorded material represented by the control signals is not re-recorded on the master recording a complete program may be made up in a relatively short time.

Another feature of the invention is the provision of transcribing apparatus for transcribing a program in accordance with the method of the preceding paragraph in which program material is introduced through a microphone and/or a player to a tape recording machine which applies this program material to one track of a master tape, and in which various control tones supplied by tone generators are selectively applied through simple controls to a separate track of the same tape.

A further feature of the invention is the provision of playback apparatus for reproducing a program transcribed on a master tape including a tape player machine with one pickup head for reproducing program material recorded on one track of the master tape, another pickup head for reproducing tones recorded on a separate track of the same tape, and a record player with an automatic changer for playing records in a predetermined sequence in response to the tones applied thereto. Auxiliary players may be provided to play records, tapes, or other recordings in response to different tones.

A still further feature of the invention is the provision of control circuits for playback apparatus of the type described in the last preceding paragraph which control circuits will operate in response to a tone to stop the master tape player and start one of the other players of recordings to provide supplementary program material, and will operate at the end of the recording to stop the player in a condition permitting immediate resumption of the supplementary material and to re-start the master tape player for reproducing program material directly from the master tape so that a continuous program may be provided automatically.

Referring to the drawings.

In practicing the invention there is provided an automatic broadcasting system including a transcribing unit for setting up a program, and a playback unit for reproducing the program and applying the same to transmitting equipment for broadcasting. The transcribing unit includes a master tape recording machine having two recording heads. Live program material such as announcements and comments, may be introduced through a microphone, and pre-recorded program material may be introduced through a record or tape player. The program material is applied through one of the recording heads to one track of a master tape. A plurality of tone generators are provided to produce different tones of short duration which represent recordings which will be played during the broadcast to provide supplementary program material. The tones are applied to a separate track of the master tape whenever the program calls for such recordings. Relays and switches are provided to enable an operator to start the tape recording machine, and to record announcements and tones in any desired sequence and thereby set up a complete program efficiently in a relatively short time. Other controls and a loudspeaker are provided so that the operator may edit the material which he has already transcribed, or preview pre-recorded material which he is about to transcribe.

The playback unit includes a tape player machine having two pickup heads, with one of the heads arranged to pick up the program material recorded on one track of the master tape, which is then amplified and applied to the transmitter. The other pickup head is arranged to reproduce the tones recorded on a separate track of the master tape. A record player including an automatic record changer is provided to be operated in response to one of the control tones. When a particular control tone corresponding to the record player is reproduced by the tone head, a control circuit is actuated to start the record which is set up on the turntable of the record player, and at the end of the tone, the control circuit shuts off the master tape player. The record provides supplementary program material which is amplified and applied to the transmitter. At the end of the record, the control circuit is actuated to re-start the master tape player and shut off the record player after the next record to be played has been set up on the turntable. Thus, a continuous program may be reproduced and broadcast with a minimum of supervision. Auxiliary players of record, tapes, or other recordings may be provided to operate in response to the other tones thereby increasing the length of the program which may be transcribed and adding flexibility to the kind of supplementary program material which may be introduced into the program.

Figures 1, 2:
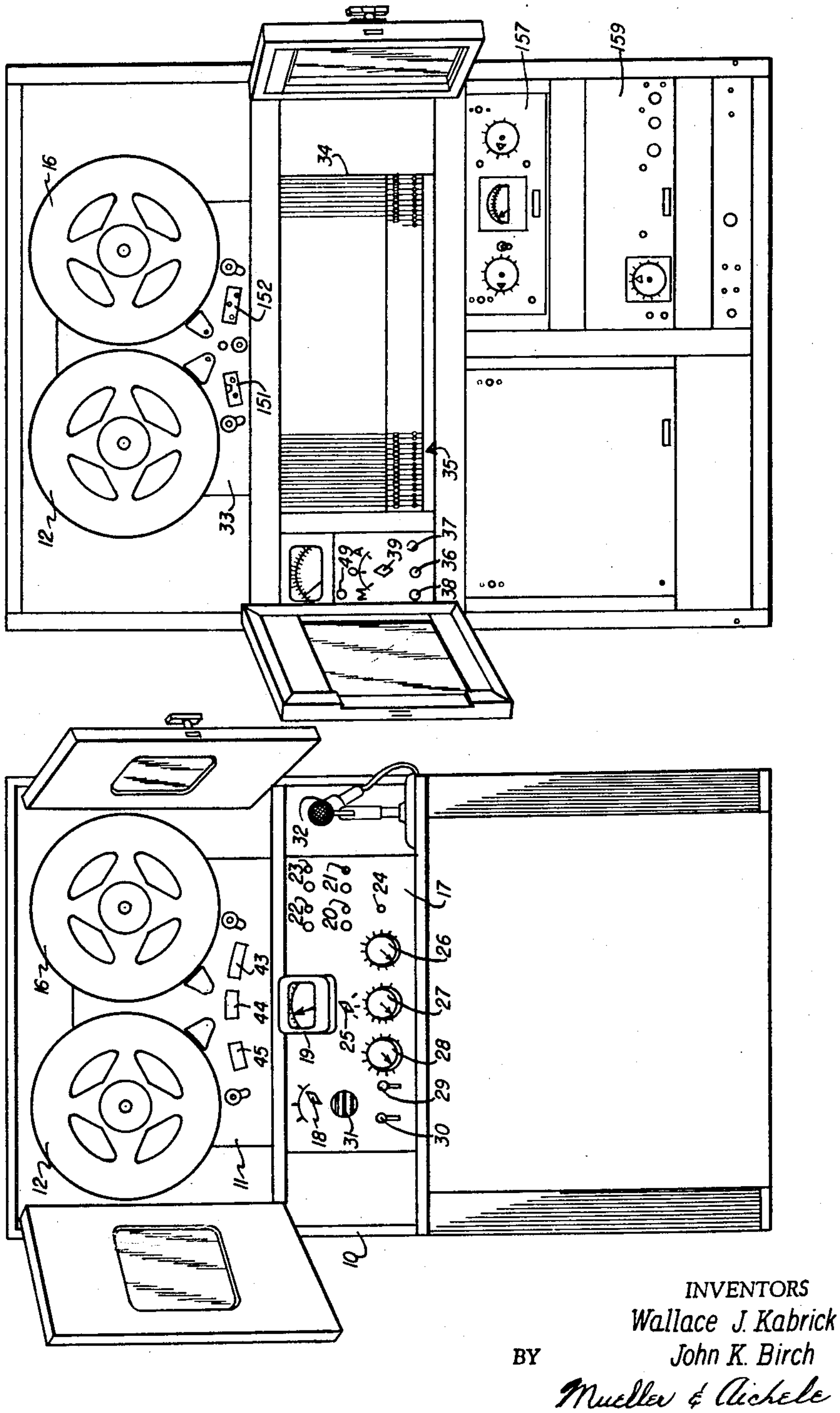
FIG. 1 is a front elevational view of a transcribing unit in accordance with the invention.
FIG. 2 is a front elevational view of a playback unit.

In FIG. 1 there is shown a transcribing unit 10 including a tape recording machine 11 with a reel 12 arranged to feed recording tape through recording heads 43 and 44 and erase head 45 to the take-up reel 16. The tape recording machine 11 is controlled by an operator through the buttons and knobs on the control panel 17. Starting in the upper left corner of the control panel, there is a selector knob 18 having three positions for recording, editing, or cueing. By operation of this knob, the operator selects the particular function which the machine is to perform. Proceeding clockwise around the control panel, there is next a meter 19 for indicating the condition of the recording equipment. On the right side of the control panel there is a group of switch buttons and indicating lights which glow when the buttons are operated. The announce button 20 is pushed to start the recording machine 11. The tone A button 21 is depressed when the operator desires to record the control tone which operates a record changer of the playback unit. The tone B and tone C buttons 22 and 23 may be depressed to record the tones for controlling auxiliary players which may be coupled to the playback unit. The pause button 24 is depressed whenever the operator desires to stop the recording machine without recording a tone. In the center of the control panel 17 there is a mixing switch 25 which may be operated to determine the type of program material which is to be recorded on the recording tape. Directly beneath the mixing switch there are three control knobs 26, 27 and 28 for controlling the level of the program material being recorded. In the lower left hand corner of the control panel there is a pair of switches 29 and 30 for operating the tape recording mechanism in a forward or reverse direction without affecting the recorded material on the tape. Directly above these switches there is a panel speaker 31 through which the operator can listen to the material which he has recorded, or through which he can preview recorded materials which are to be transcribed. Announcements are introduced through the microphone 32, and pre-recorded program material may be introduced through a player which is not shown.

In FIG. 2 there is shown the playback unit including a tape player machine 33. A record player machine is included with an automatic changer having a magazine 34 for receiving records and a plurality of selector levers 35 which may be set up to determine the sequence in which records will be played. The tape player 33 receives the pair of reels 12 and 16 which carry the recording tape on which a program has been transcribed and the tape is fed through a pair of pickup heads 151 and 152. The power switch 36 supplies power to all of the elements to condition them for operation. The motor switch 37 controls the A.C. voltage to the changer motor only. The purpose of this switch is to stop the changer mechanism from scanning when the changer is being set up, and it is operative only when the mechanism is scanning. The scan-reject button 38 may be depressed momentarily while a record is playing to reject the record and cause the changer to set up the next record selected and play it. When the scan-reject button is held down, the record changer not only rejects the record which is playing, but it will scan past all the preselected records until the button is released. It will then stop at the next pre-selected record and set it up on the turntable to be played. The changer switch 39 is used to control the method of operation of the playback unit. The normal position for this switch is in automatic, and in this position the changer tones recorded on the master tape will trigger the changer. A manual position provides a method of playing records without the use of the master tape for purposes of auditioning, testing, or in case of failure of the tape machine. In the off position, the changer will not operate and when the tape is running the changer tones will have no effect. The clear button 49 is depressed to release all relays in the playback unit, returning them to their de-energized position, which automatically starts the tape player machine. Thus, the clear button 49 may be used to reject the entire playback unit in case some defect appears in the supplementary program material being supplied by it, and the unit will then continue the program which is recorded on the master tape. Other instruments and controls may be provided for supervising the playback unit during operation.

Figure 3:
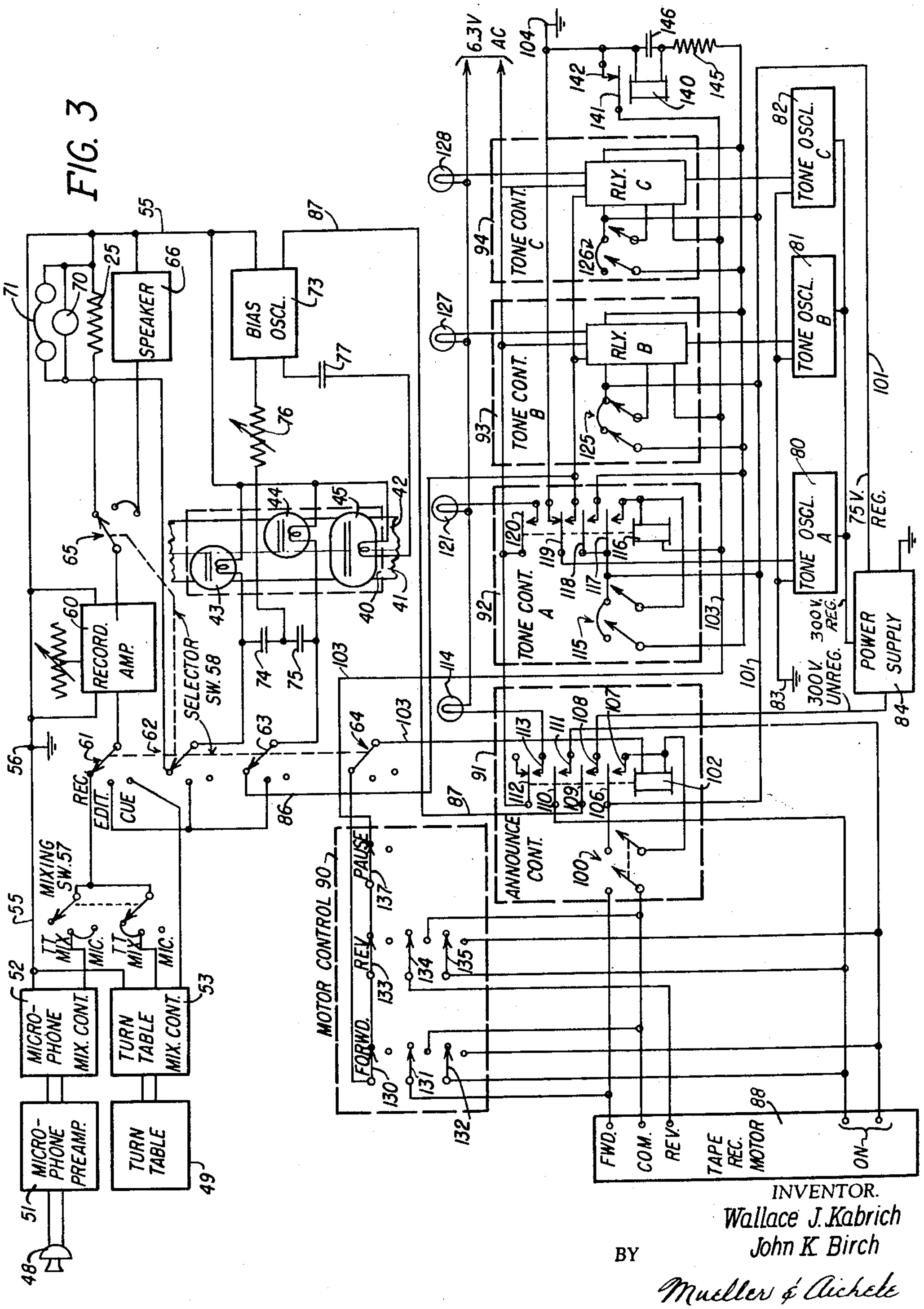
FIG. 3 shows the circuit for the transcribing system.

FIG. 3 shows the circuit of a transcribing system in accordance with the invention. The program which is to be broadcast is set up on the master tape 40 having a pair of separate tracks 41 and 42. A magnetic tape recorder having two recording heads 43 and 44 and an erase head 45 is provided to record the program on the master tape 40. Program material is recorded on the left-hand track 41 of the tape 40 by the program head 43, and control signals in the form of tones are recorded on the right-hand track 42 by the tone head 44. The erase head 45 may be operated to erase both tracks of master tape 40.

Program material may be introduced into the circuit through microphone 48 and turntable 49. Microphone 48 is used when the operator wishes to record an announcement or comment, and turntable 49 may be used to introduce pre-recorded material. Signals from the microphone 48 are amplified by the microphone preamplifier 51, and the level of these signals is controlled by the microphone mixing control 52, which is preferably a step-type attenuator. The level of signals introduced through turntable 49 is controlled by turntable mixing control 53. One output line from each of these mixing controls is connected to a common line 55 which is grounded at point 56. Another output line from each of the mixing controls is connected to a mixing switch 57. When the mixing switch 57 is in the "mix" position, program material may be introduced through the microphone and turntable simultaneously, as for example, when the operator wishes to apply announcements along with recorded background sound effects to the master tape. In the "turntable" position of mixing switch 57, the output of the microphone 48 is applied to a load within the mixing control 52 and the output of the turntable is applied to the recording amplifier 60. In the "microphone" position of mixing switch 57, the output of the turntable 49 is applied to a load within mixing control 53 and the output of microphone 48 is applied to recording amplifier 60.

The selector switch 58 may be used to select different methods of operation for the transcribing unit. In the "record" position of this switch, signals from the microphone 48 or turntable 49 are applied through recording amplifier 60 across a resistor 25, which is connected between the upper contact of level 65 of the selector switch 58 and the common ground line 55. The program head 43 is connected across the resistor 25 through the upper contact of level 62 of the selector switch 58 so that the signals applied across resistor 25 may be recorded on track 41 of master tape 40. A meter 70 and earphones 71 are also connected across the resistor 25 so that the condition of the production unit during recording may be monitored. The tone head 44 is connected from the common ground line 55 through the upper contact of level 63 of the selector switch 58 so that tones may be recorded on track 42 of master tape 40. Bias current for the recording heads 43 and 44 and the erase head 45 is supplied from a bias oscillator 73. The program head 43 is coupled to the bias oscillator 73 through a capacitor 74, and the tone head 44 is coupled to the same through a capacitor 75. Recording bias may be varied by adjusting the variable resistor 76. Erase current is applied to the erase head 45 through a capacitor 77 and returns through the common ground line 55.

When the selector switch 58 is moved to the "edit" position, both the program head 43 and the tone head 44 are connected through the middle contacts of levels 61, 62 and 63 of the selector switch to the input of the recording amplifier 60, and the output of the amplifier is connected through the middle contact of level 65 of the selector switch and speaker 66 to the common ground line 55. Thus, the program material and tones which have been recorded on the master tape 40 may be edited by the operator who hears them through the speaker 66.

In the "cue" position of the selector switch 58, the recording heads 43 and 44 are disconnected from the recording amplifier 60, and the turntable 49 is connected to the input thereof. The output of the recording amplifier 60 is connected through the bottom contact of level 65 of the selector switch and speaker 66 to the common ground line 55, while the output of the microphone 48 is applied across a load within mixing control 52. Thus, in the "cue" position, recordings which are to be included in the program may be previewed by the operator who hears them through the speaker 66.

The tones which represent supplementary program material are supplied by the tone oscillators 80, 81 and 82. These oscillators provide tones of different frequencies which are indicated as A, B and C. The output of the oscillators is normally connected to ground at point 104 and the input is connected to a power supply 84 which supplies 300 v. of regulated voltage. Tones are applied to the tone head 44 through a conductor 86, which is connected to each of the tone controls 92, 93 and 94.

300 v. of unregulated voltage for energizing the bias oscillator 73 is applied from the power supply 84, through the announce control 91 and the conductor 87. In order for any of the heads 43, 44 and 45 of the player mechanism to be operative, the announce control 91 must be energized.

The announce control 91 includes a switch 100. The upper fixed contact of the left-hand section of the switch 100 is connected to the "forward" terminal of a tape recorder motor 88, and the movable contact of this section is connected to the common terminal of the motor. When the switch 100 is closed, the motor will run the master tape 40 in a forward direction. The upper fixed contact of the right-hand section of switch 100 is connected through a conductor 101 to the power supply 84 which supplies 75 v. of regulated voltage, and the movable contact of this section is connected to the winding of a relay 102. The winding of relay 102 is also connected through the upper fixed contact of level 64 of selector switch 58 and the motor control 91 to the common ground line 103 which is grounded at point 104. Thus, when switch 100 is closed, relay 102 will be energized and the associated movable contacts will be pulled in. A circuit will then be completed from power supply 84 through conductor 101, movable contact 106, fixed contact 107, winding of relay 102, and ground line 103 to ground at point 104, so that relay 102 will remain energized to hold in all of the movable contacts when switch 100 is opened. Also, a circuit is completed from terminals of tape recorder 88 are closed through movable contact 109, and conductor 87 to the bias oscillator 73 for supplying energizing current to the same. The "on" terminals of tape recorder 88 are closed through movable contact 110 and fixed contact 111. Finally, a circuit is completed from a source of A.C. voltage through movable contact 112, fixed contact 113, and indicator light 114 whereby the indicator light will glow to notify the operator that the transcribing unit is conditioned for recording.

Normally, the program will be composed of announcements followed by records. An announcement may be applied through the microphone 48 to the program head 43, and at the end of the announcement, the operator may then operate the tone control 92 to record an "A" tone. Tone control 92 includes a switch 115 having two sections connected in parallel between the power supply 84 and ground at point 104. When the right-hand section is closed, an energizing circuit is completed from the power supply 84 through conductor 101, the winding of relay 116, ground line 103, movable contact 141, and fixed contact 142 to ground. This energizes relay 116 and pulls in all of the associated movable contacts. A parallel circuit is completed through the left-hand section of switch 115 from the power supply 84 through resistor 145 and capacitor 146 to ground. The current flowing through this parallel circuit is limited by resistor 145 and begins to charge capacitor 146. When the movable contacts of the tone control 92 are pulled in, the energizing circuit through the winding of relay 116 and the parallel circuit through capacitor 146 are shunted past switch 115 through movable contacts 117 and 118 respectively, so that these circuits will still be complete when switch 115 is opened. The output of tone oscillator 80 is normally grounded at point 104, but when movable contact 119 is pulled in, the ground circuit is broken and a circuit is completed through conductor 86 and the upper contact of section 63 of the selector switch 58 to the tone head 44, so that an "A" tone will be recorded on track 42 of master tape 40. A circuit is also completed from a source of alternating current through movable contact 120 to an indicator light 121, which glows to notify the operator that an "A" tone is being recorded. The duration of the tone is determined by the capacitor 146. When the capacitor charges to a predetermined value, movable contact 141 will be pulled in to remove ground from line 103, which is common to all of the relays of the transcribing unit. Therefore, relays 102 and 116 will be deenergized, the tone will cease, and the tape recorder motor 88 will be shut off.

The operator may now either record more announcements or another tone depending upon the requirements of the program. Tone controls 93 and 94 are connected in the same manner as tone control 92, so that the "B" and "C" tones provided by tone oscillators 81 and 82 may be selected and recorded. These tones are used to trigger auxiliary player machines which may be provided in the playback unit for playing either mechanical recordings or magnetic recordings.

The motor control 90 includes a "forward" switch, a "reverse" switch, and a "pause" switch. The "forward" switch includes three sections. Section 130 is connected in the common ground line 103, so that when this section is opened, all of the relays of the transcribing unit will be deenergized. Section 131 is normally open, and when closed, a circuit is completed between the "forward" and "common" terminals of the tape recorder motor 88. Section 132 completes a circuit across the "on" terminals of tape recorder motor 88. Thus, the tape recording mechanism may be operated in a forward direction without energizing the heads 43, 44 and 45. When the "reverse" switch of motor control 90 is depressed, section 133 opens to break the common ground line 103, section 134 closes to complete a circuit across the "reverse" and "common" terminals of tape recorder motor 138, and section 135 closes to complete a circuit across the "on" terminals of the tape recorder motor. Thus, the tape machine may be operated in a reverse direction without recording. Whenever the operator wishes to stop the recorder motor 88 without recording a tone, he may depress the "pause" switch whereupon movable contact 137 opens to break the common ground line 103 and deenergize all the relays of the transcribing unit. Since operation of the "forward" and "reverse" switches disconnects the power supply from the bias oscillator 73, the erase head cannot be operative when these switches are depressed. Ground line 103 is also broken when the selector switch 58 is in either the "edit" or "cue" positions, so the master tape 40 cannot be inadvertently erased while the operator is reviewing records or the master tape. If the operator does wish to erase material previously recorded on the master tape, he may operate the "reverse" switch of the motor control 90 and then the announce control 91 with the selector switch 58 in the "record" position.

Figure 4:
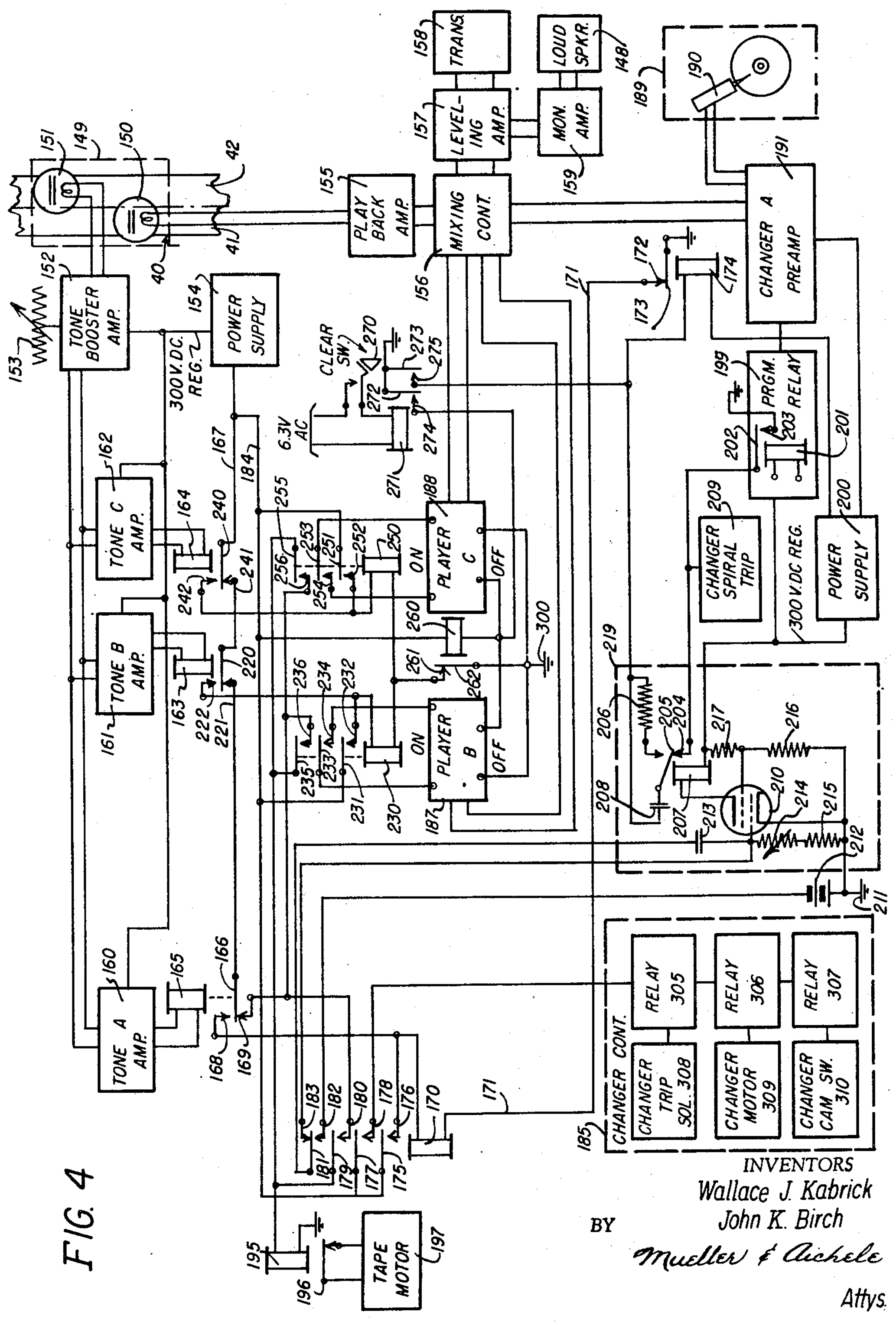
FIG. 4 shows the circuit for the playback system.

In FIG. 4 there is shown a circuit for a playback system. In this illustration, it is assumed that a program has been set up and recorded on the master tape 40 with program material being recorded on track 41 and tones being recorded on track 42. The program material is reproduced by the program pickup head 150, which forms a part of a tape player 149. The program material is applied to a playback amplifier 155 for amplification, and the amplified signals are applied through a mixing control 156, and a leveling amplifier 157 to the transmitter 158. A monitor amplifier 159 may be coupled to the output of the leveling amplifier 157 so that the program can be heard over a loudspeaker 148 for monitoring purposes. These amplifiers are shown in position in the cabinet of the playback unit in FIG. 2. When a tone appears on track 42 of the master tape 40, it is reproduced by the tone pickup head 151. Thus, because separate tracks are provided, the tones may be directly and simply separated from the program material so that they may be applied to a control circuit rather than broadcast. The tone is amplified by the booster amplifier 152, and the level of the tone is controlled by the variable resistor 153. Tone selective amplifiers 160, 161 and 162 are connected to the output of the tone booster amplifier 152. When an "A" tone is reproduced by a pickup head 151, tone amplifier 160 is energized and applies a current to the winding of a relay 165. Movable contact 166 is then pulled in to complete a circuit from the power supply 154, which supplies 75 v. of regulated voltage through conductor 167, movable contact 166, and fixed contact 168, to the winding of relay 170, which is grounded through conductor line 171 and contacts 172 and 173. Relay 170 is then energized and pulls in all of the movable contacts associated with it. A circuit is then completed from the power supply 154 through conductor 184, movable contact 175, fixed contact 176, and the winding of relay 170 to ground so that the relay 170 is held in when relay 165 is deenergized. Another circuit from the power supply 154 is completed through movable contact 177, and fixed contact 178 to the changer control circuit 185, which automatically starts the changer motor 309 and plays a record 301 which has been previously set up on the turntable of player 189 to start playing immediately. The recorded material is reproduced by the pickup arm 190 and the resulting audio frequency signals are amplified by a changer preamplifier 191. The output of the changer preamplifier is applied through the mixing control 156 to the leveling amplifier 157, and from there to the transmitter 158, so that supplementary program material is now being broadcast.

At the end of the "A" tone, the relay 165 is deenergized and movable contact 166 is released to complete a circuit from the power supply 154 through the movable contact 166, fixed contact 169, fixed contact 180, movable contact 179 and the winding of relay 195 to ground. Relay 195 is thus energized to pull in movable contact 196, and the energizing circuit for the tape player motor 197 is broken to stop the tape 40. At the end of the supplementary program material, the relay 201 is energized in a manner to be explained later and pulls in movable contact 202 to complete a circuit from ground through fixed contact 203, movable contact 202, fixed contact 204, movable contact 205, capacitor 208, and the winding of relay 174 to the power supply 200. Relay 174 is thus energized to pull in movable contact 173, thus breaking the energizing circuit for relay 170. When relay 170 is deenergized, power is removed from relay 195, and contact 196 closes so that the tape player motor 197 starts up again. Thus, the program material recorded on the master tape 40 continues without interruption and a continuous program is broadcast over the transmitter 158.

Figure 5:
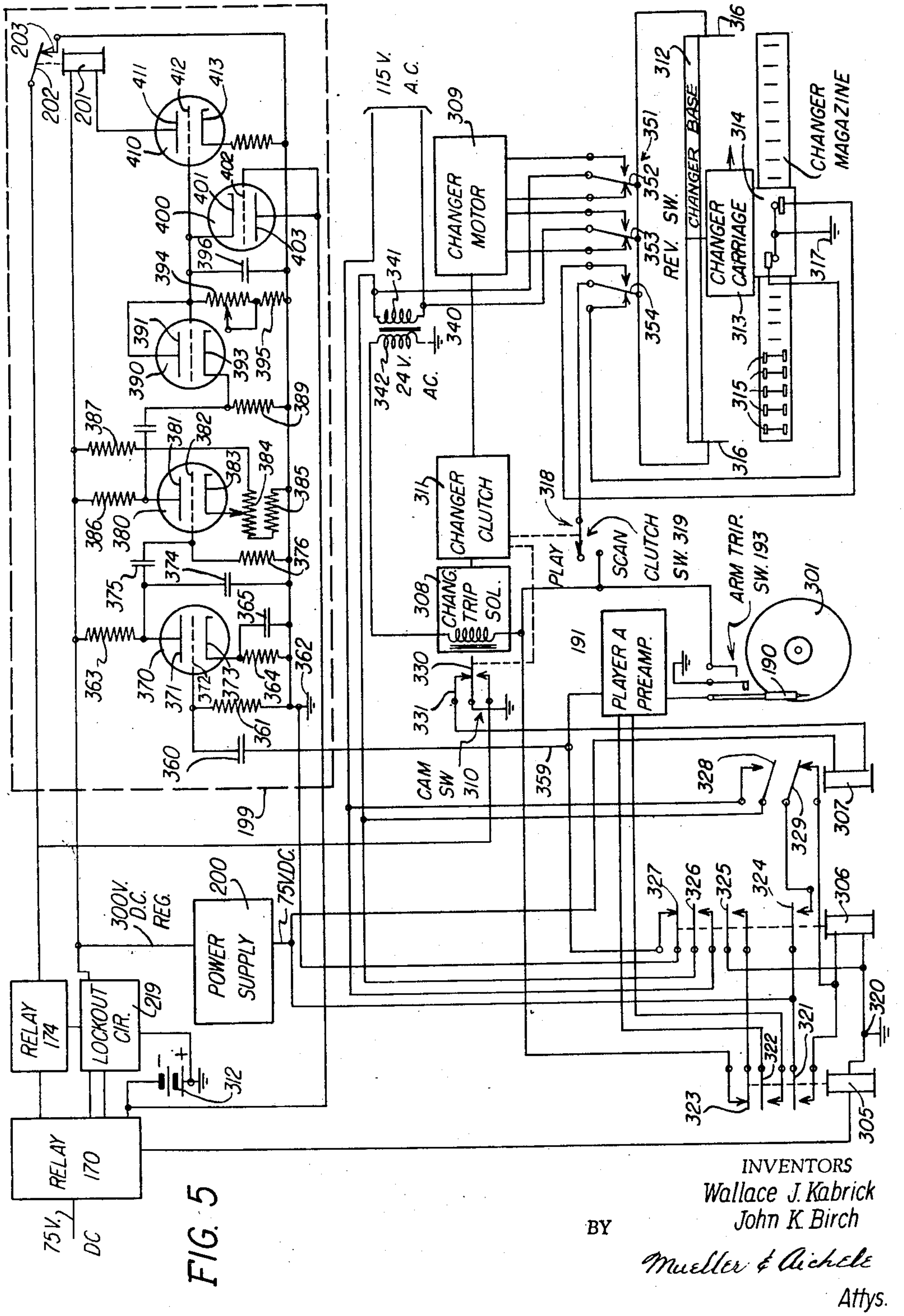
FIG. 5 shows in detail the circuit for a portion of the playback system of FIG. 4.

FIG. 5 shows the circuits which control the operation of the record changer mechanism of the playback unit. A record 301, which is conditioned for immediate playing, is shown with a pickup arm 190 positioned at the beginning of the record. When an "A" tone appears on the master tape 40, 75 volts D.C. is applied through a pair of the contacts of relay 170 and the winding of relay 305 to ground at point 320, and relay 305 pulls in all of the movable contact associated with it. When movable contact 321 is closed, a circuit is completed from the power supply 200 whereby 75 volts D.C. is applied through the winding of relay 306 to ground at point 320, and this relay is then energized to pull in all of the movable contacts associated with it. When movable contact 324 closes, the energizing current may be applied through contact 329 to the winding of relay 306 to hold it in when relay 305 is deenergized. Relay 307 is normally energized because the circuit from the power supply, through the winding of relay 307, and contacts 330 and 331 of the cam switch 310, to ground is complete when a record is conditioned for playing. When movable contact 326 of relay 306 closes, 115 volts A.C. is applied through the primary of a transformer 340, and also through movable contacts 352 and 353 of the reversing switch 351 to the changer motor 309 to start the record changer. Movable contact 327 of relay 306 opens to remove a short circuit from the high impedance input of the electronic trip circuit 199 which is connected to the relay 201. Movable contact 325 closes to complete a circuit from ground at point 320 to movable contact 323 of relay 305, but since relay 305 is energized, movable contact 323 is opened to prevent this ground from being applied to the changer trip solenoid 308. Movable contact 322 of relay 305 closes to complete a circuit in the output of the player preamplifier 191. The record 301 is now playing, and supplementary program material is being broadcast.

Audio frequency signals are also being applied to the electronic trip circuit 199 through conductor 359, capacitor 360 and resistor 361 to ground at point 362. Tubes 370, 380, 390 and 410 are connected between a line from ground at point 362 and a line from the power supply 200 which supplies 300 volts of regulated D.C. voltage to operate the tubes. Tube 370 is connected as a straight triode voltage amplifier with a resistor 363 providing a load for the anode 371, and a resistor 364 and a capacitor 365 providing bias for the cathode 373. The grid 372 receives the audio signals applied to capacitor 360 and resistor 361. Capacitor 374 bypasses the high frequencies to reduce the effect of record scratch, and the lower frequencies are applied through a coupling capacitor 375 across resistor 376. Tube 380 is connected as a gated amplifier, with a resistor 386 providing a load for the anode 381, and resistors 384, 385 and 387 providing bias for the cathode 383. Resistor 384 is a variable resistor so that the cathode bias may be adjusted to determine the amount of audio signal appearing in the anode circuit. The input is applied to the grid 382, and the output is applied across a resistor 389 and a capacitor 388. The output is rectified by tubes 390, capacitor 396, and resistors 394 and 395, and the rectified voltage is applied as a negative D.C. bias to the grid 412 of relay tube 410. The tube 410 is normally conducting, but when signals are applied to the electronic trip circuit 199, the tube 410 will be cut off to deenergize the winding of relay 201. The movable contact 202 will then open to remove ground from the winding of relay 174 to prevent tripping of the tape 40 and the record 301. When the signal is removed, the charge on capacitor 396 will hold the tube cut off until it discharges through resistors 394 and 395. This delay time prevents relay 201 from being energized on every short pause in the record. The delay time is adjustable by varying the setting of resistor 394, and is preferably set for about 1.5 seconds. The tube 400 is a clamp diode, with a reference voltage provided by the battery 312 to prevent the charge on the capacitor 396, and thus the minimum delay time, from varying with the different signal levels of different records.

When the relay 170 drops out, the energizing circuit for relay 305 is broken so that it also drops out. Movable contact 321 then opens to break one energizing circuit for relay 306, but relay 306 is held in by the parallel circuit through movable contact 324. Movable contact 322 opens to mute the player preamplifier 191. Movable contact 323 closes to complete a circuit from ground at point 320 through movable contact 325 of relay 306, movable contact 323, to the trip solenoid 308. 24 volts A.C. is supplied to the trip solenoid through the secondary 342 of transformer 340. The trip solenoid 308 acts momentarily on the changer clutch 311 which mechanically changes the mechanism from the play to the scan mode and pulls down movable contact 330 of the cam switch 310. This removes ground from the winding of relay 307 causing it to drop out. Movable contact 328 of relay 307 then closes to complete an energizing circuit for the changer motor 310 paralleling the circuit through movable contact 328 of relay 306. Movable contact 329 of relay 307 opens causing relay 306 to drop out. Movable contact 325 of relay 306 then opens to remove ground from the trip solenoid 308, and movable contact 327 closes to mute the input to the control circuit 199.

Since the changer is now in the scan mode, the changer carriage 313 moves along the changer base 312 until it reaches one of the selector levers 315 which have been previously set up according to the sequence in which records are to be played. When the changer carriage 313 reaches the end of the changer base 312, it operates one of the tabs 316 which mechanically throws the reversing switch 351. This reverses the connections for the changer motor 310 to drive the changer carriage 313 in the opposite direction. When changer carriage reaches a selector lever which has previously been set up, a circuit is completed from ground through the selector block 314, and movable contact 354 of the reversing switch 351, to movable contact 318 of the clutch switch 319. Movable contact 318 is closed mechanically by the changer clutch 311 when the next record to be played has been set up and the pickup arm 190 drops on the record. The trip solenoid 308 is then grounded, and it actuates the changer clutch 311 which changes the mechanism from the scan to the play mode and pushes up movable contact 330 of the cam switch 310. This completes a circuit to ground for the winding of relay 307 to energize the same and pull in movable contact 328. The circuit through movable contact 328 from the 115 volt A.C. source to the changer motor 309 is then broken, and the changer motor stops with a record conditioned for immediate playing.

If the electronic trip circuit 199 fails to function due to record scratch or tube failure, the trip solenoid 308 will be energized by the arm trip switch 193 which is actuated when the pickup arm 190 goes into the spiral groove of the record 301. When the arm trip switch is closed, a circuit is completed from ground to the trip solenoid so that changer clutch 311 operates to change the mechanism from the play mode to the scan mode. At the same time, movable contact 330 of cam switch 310 is pulled down to complete an energizing circuit from ground to relay 174 which energizes to break the energizing circuit for relay 170 thus dropping it out and starting the tape player mechanism as previously explained.

As previously pointed out in connection with FIG. 4, the relay 201 is energized to re-start the tape player motor 197 as soon as the record 301 stops playing. Sometimes there are pauses in the record which would tend to cause spurious response of the electronic trip circuit 199. In order to reduce this risk of spurious response, a lockout circuit 219 may be provided to open the energizing circuit for relay 174 until the end of a record is approached. The lookout circuit 219 includes a relay tube 210 with the anode connected to the winding of relay 207 and the cathode connected to ground at point 211. The tube is normally conducting with current flowing from the power supply 200 through the winding of relay 207 and tube 210 to ground. When an "A" tone energizes relay 170, a circuit is completed from a battery 212 through contacts 181 and 182, capacitor 213, and resistors 214 and 215. A negative bias voltage is thus applied to the grid of tube 210 to cut it off and deenergize the relay 207. Movable contact 205 opens to break the circuit between relays 201 and 174, and to complete a discharge path for capacitor 208 through the resistor 206. After a predetermined time, which is adjusted by controlling variable resistor 214, the capacitor 213 charges up sufficiently so that the negative voltage applied to the grid of tube 210 is reduced and the tube begins to conduct again to energize relay 207 and pull in movable contact 205. Now when relay 201 is energized a current will momentarily flow through capacitor 208 energizing relay 174 to pull in contact 173 and break the ground circuit for relay 170, thus starting the tape motor 197 as previously explained.

Auxiliary players 187 and 188 shown in FIG. 4 may be provided for playing other recordings such as tapes or wires to provide additional supplementary program material. When a "B" tone is reproduced by the tone pickup head 151, it energizes the tone amplifier 161 which in turn energizes relay 163. Movable contact 220 is then pulled in to complete a circuit from the power supply 154 through normally closed contacts 240 and 241, movable contact 220, fixed contact 222, winding of relay 230, normally closed contacts 261 and 262, to ground at point 300. Relay 230 is then energized to pull in the movable contacts associated therewith. A circuit is now completed from the power supply 154 through conductor 184, movable contact 231, and fixed contact 232 to the winding of relay 230 to hold in relay 230 after relay 163 is deenergized. The "on" terminals of auxiliary player 187 are closed through movable contact 233 and fixed contact 234, and the auxiliary player starts to play the supplementary program material recorded thereon with the audio output being applied through the mixing control 156 and leveling amplifier 157 to the transmitter 158. At the end of the tone, a circuit is completed from the power supply through contacts 240, 241, 220, 221, 166, 169, 236 and 235 to energize the winding of relay 195 which pulls in movable contact 196 and stops the tape motor as previously explained. A strip of conductive material may be affixed to the auxiliary tape at the end of the supplementary program material thereon to actuate the "off" switch of player 187 which completes a circuit from the power supply 154 through conductor 184, the winding of relay 260, and the "off" terminals of player B to ground at point 300. Relay 260 is then energized to pull in movable contacts 262 and break the energizing circuit for relay 230. Relay 230 then drops out and contacts 235 and 236 open to break the energizing circuit for relay 195 which drops out to start the tape motor 197.

The tape player 188 is connected in the same manner as is player 187 so that player 188 will start when a "C" tone is reproduced by the tone head 151.

If the operator desires to reject the supplementary material being played by any of the players, he may actuate the clear switch 270. This completes a circuit from a source of alternating current to the winding of relay 271 to energize the same and pull in movable contacts 272 and 273. A circuit is then completed from ground through movable contact 272, fixed contact 274, winding of relay 260 and conductor 184 to the power supply. Movable contact 262 opens to break the energizing circuits for relays 230 and 250 so that if either player 187 or player 188 has been playing, it will be shut off and the tape motor 197 started again. Another energizing circuit is completed from ground through movable contact 273, and fixed contact 275 and the winding of relay 174 to power supply 200. Movable contact 173 opens to break the energizing circuit for relay 170 which will reject the changer mechanism and start the tape motor 197 as previously explained.

The transcribing unit thus makes it possible to set up a program quickly and conveniently in advance of the broadcast time, and the program may be automatically produced for broadcasting by a playback unit. This saves a substantial amount of time for the announcer since it is not necessary for him to be present during the broadcast, and he can transcribe the program at a convenient time. Since separate tracks are used for program signals and control signals, there is no possibility of interaction between the signals, and the circuits for the playback unit are, therefore, simple and efficient. The program signals are translated directly to provide program material, whereas a record player is provided to produce supplementary program material. The system is flexible, however, since other players may be coupled to the playback unit to increase the number of records which may be played or to play other kinds of recordings such as tapes and wires.

We claim:

1. Programming apparatus for use with signal transmitting equipment, and which utilizes a master tape to record and reproduce audio signals providing primary program material and a plurality of records to reproduce audio signals providing supplementary program material said master tape having first and second tracks, and said records having audio signals pre-recorded thereon, said programming apparatus including in combination, a transcribing unit including signal producing means for producing audio frequency signals, tone generator means for producing tones, tape recording means having a first recording head adapted to record the audio signals on the first track of said master recording tape and a second recording head adapted to record the tones on the second track of said master recording tape, first relay means connected to said tape recording means, and switch means connected to said first relay means to actuate the same, said switch means being operable to selectively activate said first and second recording heads for recording the audio signals and tones in a predetermined sequence, and said relay means being operative to automatically stop said tape recording means after a tone has been recorded; and a playback unit including first player means for playing said recording tape, said first player means having a first pickup head coupled to said transmitting equipment for reproducing the audio signals to provide program material, and said first player means having a second pickup head responsive to the tones, second player means including record changer means for automatically playing the records according to a predetermined sequence, and control circuit means coupling said second recording head of said first player means to said second player means, said control circuit means including second relay means operative to start said second player means in response to the tones for providing supplementary program material, said second relay means further being operative to stop said first player means at the end of a tone, electronic trip means connected to said second player means and to said second relay means and capable of sensing the end of the audio signals on the records and thereupon actuating said second relay means, said second relay means being operable automatically upon actuation by said electronic trip means to start said first player means at the end of each record, and third relay means connected to said second player means and operative to stop the same after said record changer means has automatically cued up the next selected record in a condition for playing.

2. Programming apparatus for use with signal transmitting equipment, and which utilizes a master recording tape to record and reproduce audio signals providing primary program material and a plurality of records to reproduce audio signals providing supplementary program material, said master tape having first and second tracks, and said records having audio signals pre-recorded thereon, said programming apparatus including in combination, a transcribing unit including signal producing means for producing audio frequency signals, a plurality of tone generator means for producing tones of different frequencies, tape recording means having a first recording head adapted to record the audio signals on the first track of said master recording tape and a second recording head adapted to record the tones on the second track of said master recording tape, first relay means connected to said tape recording means, and switch means connected to said first relay means to actuate the same, said switch means being operable to selectively activate said first and second recording heads for recording audio signals and tones in a predetermined sequence and to select a particular tone to be recorded, and said relay means being operative to automatically stop said tape recording means after a particular tone has been recorded; and a playback unit including first player means for playing said recording tape, said first player means having a first pickup head coupled to said transmitting equipment for reproducing the audio signals to provide program material, and said first player means having a second pickup head responsive to the tones recorded on the second track of said recording tape, a plurality of tone selector means coupled to said second pickup head to be operated selectively in response to said tones, second player means including record changer means for automatically playing the records according to a predetermined sequence, auxiliary player means for playing other recordings, and control circuit means coupling said tone selector means to said second and auxiliary player means, said control circuit means including second relay means operative to start one of said second and auxiliary player means in response to a particular tone for providing supplementary program material, said second relay means further being operable to stop said first player means at the end of a tone and to start said first player means at the end of said supplementary program material, electronic trip means coupled to said second player means and to said second relay means, said electronic trip means being capable of sensing the end of a segment of the audio signals on the record and thereupon actuating said second relay means to start said first player means, said control circuit means further including third relay means connected to said second and auxiliary player means and operative to stop the same at the end of a predetermined amount of supplementary program material in a position whereby playing may be resumed immediately in response to a tone.

3. Apparatus for automatically producing a program and operable from a master recording tape having control signals and audio program signals recorded thereon, said apparatus including in combination, first player means for playing said recording tape, said first player means having pickup head means for reproducing the audio signals to provide program material and responsive to the tones recorded on said recording tape, a plurality of tone selector means coupled to said pickup head means to be operated selectively in response to said tones, second player means including record changer means for automatically playing records according to a predetermined sequence, auxiliary player means for playing other recordings, and control circuit means coupling said tone selector means to said second and auxiliary player means, said control circuit means including first relay means operable to start one of said second player means and said auxiliary player means in response to a particular tone for providing supplementary program material, said first relay means further being operable to stop said first player means at the end of a tone and to start said first player means at the end of said supplementary program material, program operated trip means coupled to said second player means and to said first relay means, said trip means having the ability to sense the end of the audio signals on the records and thereupon actuate said first relay means to start said first player means, and said control circuit means further including second relay means connected to said second player means and operable to stop the same after said record changer means has cued up the next selected record in the sequence in a position whereby playing may be resumed immediately in response to a tone.

4. A programming system for use with a broadcasting transmitter, and which utilizes tape transport means and a master tape to record and reproduce audio signals providing primary program material, and a plurality of records having audio signals prerecorded thereon providing supplementary program material, said programming system including in combination, recording means for recording primary audio signals and control tones on the master tape, signal translating means including audio input means for supplying the primary audio signals, tone generator means for supplying the control tones, control means including switch means connected to said recording means and operable to selectively activate the same for recording segments of primary audio signals and control tones in a predetermined sequence, playback means associated with the tape transport means for playing back the master tape to reproduce the primary audio signals and the control tones recorded thereon, record player means including automatic changer means for playing the records in a predetermined sequence to reproduce the audio signals prerecorded thereon, output means coupled to said playback means and to said record player means for applying the primary and supplementary audio signals therefrom to the transmitter, and control circuit means coupled to said playback means and the tape transport means and to said record player means for controlling the sequence of operation thereof, said control circuit means including tone selector means coupled to said playback means for selectively translating the control tones reproduced thereby, relay means coupled to said tone selector means and responsive to the control tones, said relay means being automatically operated to start said record player means and to stop said tape transport means in response to predetermined control tones, electronic trip means coupled to said record player means and to said relay means and responsive to the supplementary audio signals reproduced thereby, said electronic trip means being capable of sensing the end of a segment of the audio signals on the record and thereupon actuating said relay means, said relay means being operable automatically upon actuation by said electronic trip means to start said tape transport means at the end of each record and stop said record player means with the next record in the sequence thereof cued up and in a condition to be played immediately, whereby a continuous program consisting of several segments of primary and supplementary program signals interspersed in a desired sequence is provided.

5. A programming system for use with a broadcasting transmitter, and which utilizes tape transport means and a master tape to record and reproduce audio signals providing primary program material, and a plurality of records having audio signals prerecorded thereon providing supplementary program material, said programming system including in combination, recording means associated with the tape transport means for recording primary audio signals and control tones on the master tape, signal translating means including audio input means for supplying the primary audio signals, tone generator means for supplying the control tones, control means connected to said recording means and the associated tape transport means, said control means including first relay means and switch means operable to start said tape transport means and to selectively activate said recording means for recording segments of primary audio signals and control tones in a predetermined sequence, said first relay means being automatically operative to stop said tape transport means after a control tone has been recorded, playback means associated with the tape transport means for playing back the master tape to reproduce the primary audio signals and the control tones recorded thereon, record player means including automatic changer means for playing the records in a predetermined sequence to supply supplementary audio signals, output means coupled to said playback means and said record player means for applying the primary and supplementary audio signals to the transmitter, and control circuit means coupled to said playback means and the tape transport means and to said record player means for controlling the sequence of operation thereof, said control circuit means including tone selector means coupled to said playback means for selectively translating the control tones reproduced thereby, second relay means coupled to said tone selector means and responsive to the control tones, said second relay means being automatically operative to start said record player means and to stop the tape transport means in response to predetermined control tones, electronic trip means coupled to said second relay means and to said record player means and responsive to the supplementary audio signals reproduced thereby, said electronic trip means including a vacuum tube circuit energized by the audio signals from said record player means and being sensitive to the termination of such audio signals for a predetermined time so as to provide a control signal for actuating said second relay means, said second relay means being operated automatically upon actuation by said electronic trip means to start the tape transport means at the end of each record and stop said record player means with the next record in the sequence thereof cued up and in a condition to be played immediately, whereby a continuous program consisting of several segments of primary and supplementary program material interspersed in a desired sequence is provided.

6. A programming machine for use with a broadcasting transmitter, and which utilizes a master tape having primary audio signals representing primary program material and control tones representing supplementary program material recorded thereon and interspersed in a predetermined sequence, and which also utilizes a plurality of records having audio signals prerecorded thereon for providing the supplementary program material, said programming machine including in combination, tape transport means, playback means associated with said tape transport means for playing the master tape to reproduce the primary audio signals and the control tones recorded thereon, record player means including automatic changer means for playing a plurality of the records in a predetermined sequence to supply supplementary audio signals, output means coupled to said playback means and said record player means for applying the primary and supplementary audio signals to the transmtter, and control circuit means coupled to said playback means and said tape transport means and to said record player means for controlling the sequence of operation thereof, said control circuit means including tone selector means coupled to said playback means for selectively translating the control tones reproduced thereby, relay means coupled to said tone selector means and responsive to the control tones, said relay means being automatically operative to start said record player means and to stop said tape transport means in response to predetermined control tones, electronic trip means coupled to said relay means and to said record player means and responsive to the supplementary audio signals reproduced thereby, said electronic trip means including electron devices for translating the audio signals from the records and capable of sensing the end of the audio signals to provide an actuating signal for actuating said relay means, said relay means being operated automatically upon actuation by said electronic trip means to start said tape transport means at the end of each record and to stop said record player means with the next record in the sequence thereof cued up and in a condition to be played immediately, whereby a continuous program consisting of several segments of primary and supplementary program material interspersed in a desired sequence is provided.

7. A programming machine as described in claim 6 and further including time delay circuit means connected to said relay means rendering the same unresponsive to said electronic trip means for a predetermined time to avoid premature operation thereof.

8. An automatic programming system for use with a broadcasting transmitter and which system cooperates with tape transport means, a recording tape capable of recording and reproducing audio signals and control signals, and a plurality of record discs having audio signals pre-recorded thereon in grooves, said programming system including in combination, tape recording means having signal input means for recording locally produced audio signals and control signals on the tape in a predetermined sequence, tape reproducer means associated with the tape transport means for playing the tape to reproduce the audio signals and the control signals recorded thereon, a record player including automatic changer apparatus for receiving and playing a plurality of the records in a selected sequence to reproduce the audio signals pre-recorded on the records, signal output means coupled to said tape reproducer means and to said record player and adapted to be coupled to the transmitter for receiving the audio signals from the tape and the audio signals from the records and supplying the same to the transmitter, control circuit means including a selective circuit for selectively translating the control signals from the tape, first relay means coupled to said selective circuit for receiving the control signals therefrom, said first relay means being automatically operable to start said record player and to stop said tape transport means in response to predetermined control signals, an automatic trip circuit coupled to said record player and cooperating with said first relay means, said trip circuit having electron devices energized by the audio signals on the record for translating such audio signals and providing an actuating signal upon termination of such audio signals for a predetermined time, said first relay means including a portion receiving the actuating signal and automatically responding to the actuating signal to start said tape transport means, said control circuit means further including second relay means coupled to said changer apparatus and operable automatically to cause said changer apparatus to cue up another segment of audio signals on a record in a condition to be reproduced immediately, whereby a continuous program consisting of audio signals from the tape and audio signals from the records interspersed in a desired sequence is provided for broadcasting.

9. An automatic programming machine for use with a broadcasting transmitter and which cooperates with tape transport means, a recording tape having audio signals and control signals specially recorded thereon in a predetermined sequence, and a plurality of record discs having only audio signals suitable for program material prerecorded thereon in grooves, said programming machine including in combination, tape reproducer means associated with the tape transport means for playing back the tape to reproduce the audio signals and the control signals recorded thereon, a record player including automatic changer apparatus for receiving and playing a plurality of the records in a selected sequence to reproduce the audio signals pre-recorded on the records, signal output means coupled to said tape reproducer means and to said record player and adapted to be coupled to the transmitter for receiving the audio signals from the tape and the audio signals from the records and supplying the same to the transmitter, and control circuit means including a selective circuit for selectively translating the control signals from the tape, first relay means coupled to said selective circuit for receiving the control signals therefrom, said first relay means being automatically operable to start said record player and to stop said tape transport means in response to predetermined control signals, an automatic trip circuit having an input portion coupled to said record player for receiving the audio signals from the records and an output portion coupled to said first relay means, said automatic trip circuit including a plurality of interconnected electron devices energized by the audio signals from the records, with one of said electron devices being coupled to said output portion, and means controlling the conduction of said one electron device responsive to the audio signals from the records such that said one electron device applies an output signal to said output portion for actuating said first relay means upon termination of the audio signals for a predetermined time, said first relay means including a portion receiving said output signal and operable automatically upon actuation thereof by said output signal to start said tape transport means, said control circuit means further including second relay means coupled to said changer apparatus for causing the same to cue up another segment of audio signals on a record in a condition to be reproduced immediately, whereby a continuous program consisting of audio signals from the tape and audio signals from the records interspersed in a desired sequence is provided for broadcasting.

References Cited in the file of this patent

UNITED STATES PATENTS

| | | |
|---|---|---|
| 2,558,853 | Kappeler | July 3, 1951 |
| 2,615,989 | Thad | Oct. 28, 1952 |
| 2,780,679 | Vandivere | Feb. 5, 1957 |
| 2,802,060 | Coco | Aug. 6, 1957 |